US006209443B1

(12) United States Patent
Perez

(10) Patent No.: US 6,209,443 B1
(45) Date of Patent: Apr. 3, 2001

(54) LOW PRESSURE ACTUATOR

(75) Inventor: Jose Perez, Vancouver (CA)

(73) Assignee: Hiflex Technologies Inc., Vancouver (CA)

( * ) Notice: Subject to any disclaimer, the term of this patent is extended or adjusted under 35 U.S.C. 154(b) by 0 days.

(21) Appl. No.: 09/113,009

(22) Filed: Jul. 9, 1998

(51) Int. Cl.[7] ................................ F16J 3/00; F01B 19/00

(52) U.S. Cl. .................................................. 92/39; 92/136

(58) Field of Search ................................ 92/39, 98 R, 99, 92/136

(56) References Cited

U.S. PATENT DOCUMENTS 4,006,669 * 2/1977 Price .
4,008,008 * 2/1977 Vergnet .
4,108,050 * 8/1978 Paynter .
4,615,260 * 10/1986 Takagi et al. .
4,777,868 * 10/1988 Larsson .................................... 92/42
4,833,973 * 5/1989 Wang .
4,841,845 * 6/1989 Beullens .
4,860,639 * 8/1989 Sakaguchi .
5,067,390 * 11/1991 Negishi .
5,158,005 * 10/1992 Negishi et al. .
5,201,262 * 4/1993 Negishi et al. .

* cited by examiner

*Primary Examiner*—Edward K. Look
*Assistant Examiner*—Thomas E. Lazo
(74) *Attorney, Agent, or Firm*—Christie, Parker & Hale, LLP

(57) ABSTRACT

The device comprises an elongated elastomer tube, sealed tightly by clamps at each end against disk shaped end pieces, the one end disk fixed and the other sliding, axially to the other disk, on restraining rods. An orifice in the fixed disk permits the injection of pneumatic pressure causing the expansion of the elastomer tube. Surrounding the elastomer tube is a restraining tube of woven fabric or other material which will not expand radially. The second tube is also affixed to each end disk by the clamps and has sufficient length to reach between the two disks when the disks are at their farthest distance from each other. When the disks are not fully distanced from each other, the outer tube crumples axially but not radially. Action commences when the disks are closest to each other. Controlled pneumatic pressure injected through the orifice causes expansion of the elastomer tube. The outer restraining tube causes all force to be directed to move the sliding disk away from the fixed disk on the guiding mechanism, thus creating an axial force.

26 Claims, 4 Drawing Sheets

LOW PRESSURE ACTUATOR

TECHNICAL FIELD OF THE INVENTION

This invention relates to a novel low pressure mechanical actuator. More particularly, this invention pertains to a novel low pressure pneumatic or hydraulic device which creates a linear or radial mechanical force to move components, machinery or control valves.

BACKGROUND OF THE INVENTION

Mechanical actuators with pistons are widely used in industry for moving parts or components of machinery to carry out various functions. Actuators are used in assembly lines or industrial processes to control valves, or to operate equipment. Actuators usually operate using pneumatic or low pressure hydraulic fluid to create a force, linear or rotary, to move a component or piece of machinery.

Pneumatic pistons or actuators are of two basic types:

A. Bellows. These typically are hollow and consist of preformed rubber which extends and contracts in a linear manner by an "accordion" mechanism extending or collapsing the elastomer. To avoid radial bulging, the rubber must be very heavy, horizontal movement must be very short in relation to the radial dimension of the accordion shape, and pneumatic pressure must be sufficiently low so as not to rupture the rubber. Bellows type pistons are useful primarily for short thrust, low pressure movements such as switch or brake activation. Typical maximum working pressures of bellows type pistons are limited to about 20 psig.

B. Solid tube pistons. These actuators typically comprise a solid piston sliding within a hollow solid (usually metal) tube. Solid tube pistons typically operate at working pressures in the range of about 80 psig. To contain the required pneumatic force on the piston, one or more rubber air seals enclose the circumference of the piston and thereby contain the air. The air seals are similar to piston rings in an internal combustion engine. Typically, since the piston moves along the axis of the interior of the tubular cylinder, a linear force is generated. The term "actuator" is often applied in situations where a rotary (torque) force is to be generated. In the case of mechanical actuators, the rotational force is usually obtained by utilizing a rack and pinion arrangement within the cylinder. The rack is attached to the piston and the pinion exits the cylinder radially. This requires a seal (an O-ring, for example) to contain the air pressure. Various types of actuators are available, for example, double action and spring return.

The sliding piston in a fixed cylinder is commonly used for applications such as valve stem rotation. The inherent problem with this type is that they are expensive to manufacture and have wear and friction problems associated with the necessity for sliding seals on the pistons. Contaminated air can significantly shorten the life of the seals, and the design of such actuators does not permit economical serviceability. Some applications therefore require the air to be filtered or otherwise treated to prolong actuator service life.

Other linear movement mechanisms exist which comprise a tube that stretches in a linear manner, such as for air ducting used in ventilation systems. These stretchable tubular mechanisms include plastic tubing with embedded coiled wire which allows horizontal stretch of the tubing. The coiled wire provides radial strength. There is an inherent problem with such tubes. When a high pneumatic pressure is applied to the tube, it tends to turn and cause localized bulging. Such tubes with internal or embedded coils are thus suitable only for very low pressure applications.

Various inventors have attempted to solve the problems inherent in the designs of these two types of actuators by using a sealed rubber tube (air bag) and restraining its radial expansion by various means other than a bellows. These systems generally involve surrounding the rubber tube with an outer tube having helical wires. This allows the outside tube to stretch without bulging. Another method utilizes a second outside tube with compensating pneumatic pressure. These systems generally shorten the available stroke of the actuator relative to its length and also set up counteracting forces which significantly decrease the mechanical efficiency of the expanding inner tube.

Actuators usually employ one of two methods for activation:

A. The principle of physics that when pressure is applied to the inside surfaces of an "elastomer bag" of any shape (for example, an elongated balloon) the pressure will tend to force the bag into a spheroid shape. Thus the pressure attempts to equalize itself within the confines of the volume. This is described herein as "equalizing pressure".

B. Restraining radial expansion of an elastomer bag by a series of two opposed diagonal windings for which the angle of the crossing points changes to allow some lengthening of the tube until a maximum angle change occurs. This is described as "radial constraint".

A number of patents have been issued over the years disclosing various devices that employ one or the other, or both, of principles A and B above.

Beullens—U.S. Pat. No. 4,841,845

Beullens utilizes the equalizing pressure principle. This is demonstrated by the description of FIGS. 1 and 2 as being in the inactive position and FIG. 3 as being in the active position. Column 4, paragraph 40, discloses that "the working points . . . are pulled towards one another". The purpose of the spiral wires in Beullens appears to be not only to stop the device from "blowing up" but also to redirect the radial force to a horizontal sucking force when maximum radial size is reached.

The device comprises on the one hand at least one tightly-sealable chamber, which is restricted by a wall made from a partially distortable material, and on the other hand flexible, approximately unstretchable spiral-wound filaments which extend substantially next to one another at least about said wall, whereby part of said filaments are wound rightwards and another part thereof leftwards, and this in such a way that two arbitrary crossing filaments may undergo some angular displacement relative to one another, and the one end of each said filaments on the one side of said chamber is fixed relative to a working point, and the other end thereof on the opposite side of said chamber is fixed relative to another working point, and whereby further at least one feed opening is provided in said chamber, wherethrough a pressurized gas or liquid may be fed and said wall is distortable at least along one direction cross-wise to the line joining both said working points, in such a way that by regulating the gas or liquid pressure inside the chamber, a relative displacement of said working points occurs.

Negishi—U.S. Pat. No. 5,201,262

Negishi utilizes the radial constraint principle. The actuator of Negishi includes an elastic member extensible in axial directions when a pressurized fluid is supplied into the elastic member, and a guiding device arranged inwardly of the elastic member and permitting the elastic member to move in the axial directions but restraining the elastic member from moving in directions intersecting the axial directions. The actuator is of an air-bag type so that energy of the pressurized fluid can be converted into mechanical movement with high efficiency. The actuator moves only in axial directions without expanding in radial directions, so that a space occupied by the actuator in operation is little. Due to the restrictions of angle change of the "reinforcing braided structure", there is limited travel of this actuator in relation to its length. This limits its application. The other "embodiment" (FIG. 3*a*) is the addition of a return spring outside the actuator.

Negishi—U.S. Pat. No. 5,158,005

The device disclosed by Negishi in this patent is very similar to the device in his U.S. Pat. No. 5,201,262, except that the guiding tube is now outside instead of inside. The actuator of this patent includes an elastic member extensible in axial directions when a pressurized fluid is supplied into the elastic member, and a guiding device arranged outwardly of the elastic member and permitting the elastic member to move in the axial directions, but restraining the elastic member from moving in directions intersecting the axial directions. The actuator is of an air-bag type so that energy of the pressurized fluid can be converted into mechanical movement with high efficiency. The actuator moves only in axial directions without expanding in radial directions, so that the actuator takes up little space in operation. The telescopic tube appears to be used not to prevent expansion of the elastomer (this is done by the braided structure) but to keep the piston pointed in the same direction. If the braided structure were not there, the elastomer would abrade against and pinch against the telescopic tube. There is limited travel on this piston.

Negishi—U.S. Pat. No. 5,067,390

Negishi, in this case, employs a combination of the equalizing pressure and radial constraint principles, whereby there are two concentric pressure tubes. The double-acting actuator of U.S. Pat. No. 5,067,390 includes a tubular body made of an elastic material, with a first reinforcing braided structure surrounding it. A second tubular body made of an elastic material surrounds the reinforced braided structure to form a space outwardly. A second reinforcing braided structure surrounds the second tubular body. The actuator further includes closure members for closing and joining ends of the first and second tubular bodies and reinforcing braided structures, and guiding device for permitting axial movements of the first and second tubular bodies but restraining lateral movements thereof. The first and second reinforcing braided structures are so constructed that initial braided angles thereof permit of the first braided structure elongating and permit of the second braided structure contracting when the pressurized fluid is supplied into the first and second tubular bodies. The fluid pressure is varied between the tubes so that the outside tube at one point has higher pressure than the inside tube and thus restrains radial expansion, directing the force to horizontal thrust. This device also has limited movement.

Sakaguchi—U.S. Pat. No. 4,860,639

Sakaguchi discloses a classic example of the equalizing pressure principle. The actuator of Sakaguchi includes a tubular body made of a rubber-like elastic material and a braided structure made of organic or inorganic high-tensile-strength fibers reinforcing an outside of the tubular body. Closure members sealingly close ends of the tubular body; at least one of the closure members has a fluid connecting passage. The tubular body deforms to expand its diameter when pressurized fluid is introduced through the connecting passage to cause contractive force in the longitudinal direction. Contraction-detecting strain gauges at one closure member provide signals corresponding to the contractive force of the actuator.

Takagi—U.S. Pat. No. 4,615,260

This device also operates according to the equalizing pressure principle with modifications to improve and decrease fatigue. Takagi discloses a pneumatic actuator including an elastic tubular body, closure members sealingly closing its ends and a braided structure made of braided cords reinforcing the tubular body. The braided structure is expanded in its radial direction and simultaneously contracted in its axial direction together with the tubular body when pressurized fluid is supplied into the tubular body. According to the invention the braided cords of the braided structure comprise monofilaments, each having a smoothly rounded outer surface of a large radius of curvature. A protective layer may be provided between the tubular body and the braided structure or a filler such as an incompressible fluid substance having no constant shape is provided in the tubular body, or diameters of both ends of the braided structure and braided angles at both the ends are made larger than those at a substantially mid-portion of the braided structure. The actuator according to the invention decreases damage of the tubular body to elongate its service life and exhibits an improved contacting performance and high fatigue strength and can greatly save air consumption to eliminate the disadvantage of much air consumption of the air-bag type actuator without adversely affecting its advantages.

Wang—U.S. Pat. No. 4,833,973

The fluid pressure actuated assembly disclosed in Wang includes a casing made of a flexible resilient material, such as rubber or polyurethane, a coiled tension spring sleeved on the casing for biasing the casing to move toward a retracted position, and a coiled spacing spring interposed between the tension spring and the casing for preventing any wall of the casing from being clamped between any two adjacent turns of the tension spring. When a compressed fluid is applied to the interior of the casing, the casing extends. This uses the return spring for radial restraint, but adds a spacing spring in between to prevent the flexible material from pinching between the turns of the return spring.

Paynter—U.S. Pat. No. 4,108,050

Paynter discloses a method of creating a torque by pressurizing the inside of a tube having preformed spiral spring wires (helically shaped) on the outside. The expansion pressure forces the wires to straighten (ie. lose their spiral) and thus turn one end of the device.

Vergenet—U.S. Pat. No. 4,008,008

The invention, among other things, provides a pump adapted for the intake and delivery of liquid such as water in wells or relatively deep bodies of water. The pump comprises a rigid-walled chamber, adapted to be immersed in the liquid to be sucked in. The rigid-walled chamber has an intake valve and a delivery valve interposed between the rigid-walled chamber and a delivery tube. The pump is characterized in that it comprises, accommodated in the rigid-walled chamber, a resiliently deformable chamber associated with means for controlling, at least in one direction, alternate deformations of the chamber by expansion and retraction. This is a device for a submersible pump (well pump, for example). There is a deformable plunger on the end of the handle at the top to increase the pressure exerted on the water in the well, forcing the water up a tube.

Larsson—U.S. Pat. No. 4,777,868

Larsson discloses a flexible actuator, comprising at least a pressure tube, which is axially extendable and/or contractible under influence of a pressure fluid. The object of the invention is to provide a flexible actuator, which can perform straight axial movements as well as curved movements in one or more planes and which can also operate at very high pressures. These objects have been achieved by the fact that the tube (12) with the exception of its end, connection or attachment parts (13) is corrugated and that at least the portions (10) of the corrugated tube, which are located between its outward projecting folds (9), are equipped with means (8) of a material which is inextensible as compared to the material of the tube, and arranged substantially to prevent a radial expansion and/or contraction of the tube in said portions (10). This is effectively a very long bellows type with strengthening in the folds of the bellows to prevent bulging. He has claimed many variations to prevent the bulging, but all rely basically on the bellows idea and strengthening with helical wire reinforcing.

Price—U.S. Pat. No. 4,006,669

Price discloses a fluid pressure activated piston slidably carried in a fluid pressure actuated cylinder which, in turn, is slidably carried in a fixed carrier. Movement of the cylinder is resisted by a deformable tube frictionally engaged with a fixed circular member. A predetermined fluid pressure acting across a differential area wall portion of the cylinder generates a force overcoming the frictional resistance of the deformable tube engaged with the fixed circular member thereby advancing the cylinder in the direction of movement of the pressurized piston. The output force of the piston is substantially unaffected by the force imposed on the cylinder. This is a very complicated device to be used for aircraft brake actuation. The only flexible material appears to be a radially deformable member inside the cylinder to alter the movements.

SUMMARY OF THE INVENTION

The invention is directed to an actuator comprising: (a) a flexible hollow fluid impermeable bladder which can be expanded along an axis when a fluid is introduced into the bladder; and contracted along the same axis when the fluid is withdrawn from the bladder; (b) a moveable mechanism associated with the bladder that moves in the same direction when the bladder expands upon the introduction of fluid into the bladder.

The bladder can be expandable in all directions, but is confined in a restrainer which restricts expansion of the bladder to the one axis. The fluid can be compressed air or hydraulic oil. A moveable connector can be associated with a moveable end of the expandable bladder and can link the bladder to the moveable mechanism. The moveable mechanism can be a piston. The movable connector can slide on a restraining rod.

The bladder and moveable mechanism can be housed in a rigid frame. A fixed connector can be located on an end of the bladder opposite to the moveable connector and can secure a fixed end of the bladder to the rigid frame.

The piston can be attached to a yoke which converts axial motion to rotary motion. The bladder can be attached externally to a toothed rack acting on a pinion to convert linear motion to rotary motion. Several rack mechanisms can be fixed radially on a plane, acting on a common pinion in the centre to create torque and/or return action.

First and second bladders can be placed end to end on opposite sides of the moveable mechanism and can provide reciprocating action to the moveable mechanism in either direction along the axis when fluid is alternatingly introduced into the first and second bladders.

The first and second bladders can have toothed racks which engage with teeth on the moveable mechanism. First, second, third and fourth bladders can be arranged in opposing pairs orientation about the moveable mechanism and can actuate the moveable mechanism in unison. The moveable mechanism can be a gear and the first, second, third and fourth bladders can have toothed racks which can engage the teeth of the gear.

The bladder can be made of elastomer. The restrainer can be made of a collapsible fabric. A spring return can be attached internally within the bladder, or externally. The bladder can be attached at each end to the restrainer or attached throughout its length to the restrainer.

BRIEF DESCRIPTION OF DRAWINGS

In drawings which illustrate specific embodiments of the invention, but which should not be construed as restricting the spirit or scope of the invention in any way.

DETAILED DESCRIPTION OF SPECIFIC EMBODIMENTS OF THE INVENTION

Figure 1:
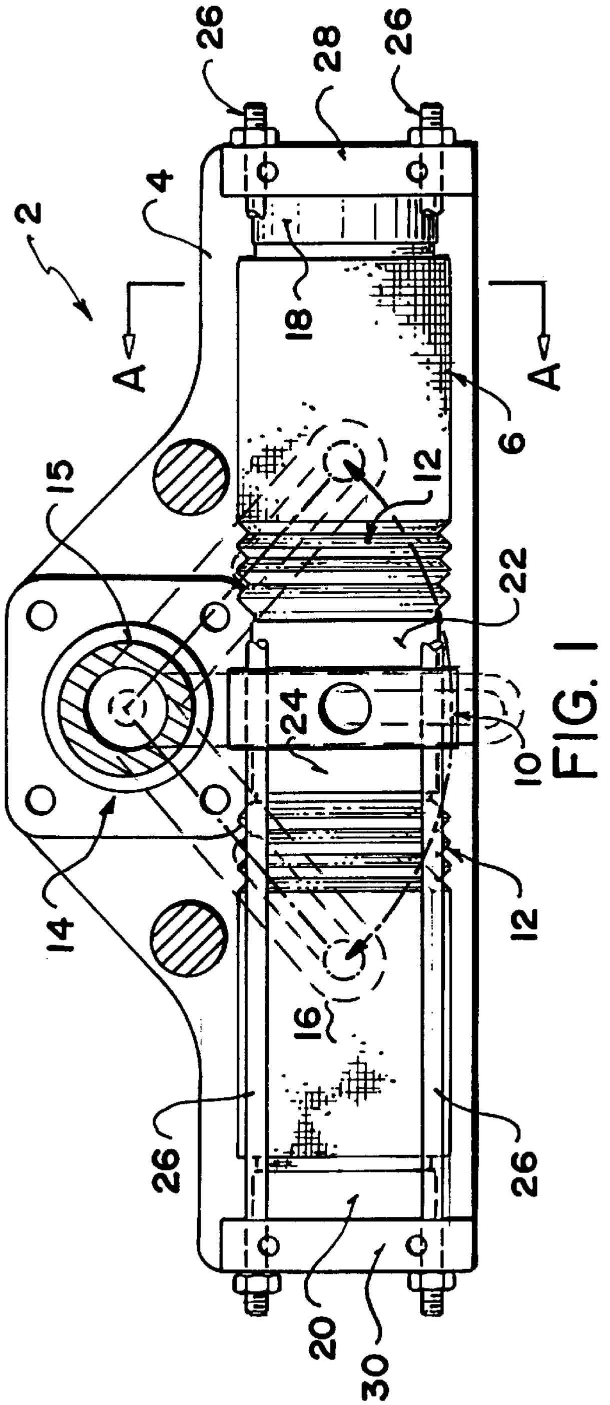
FIG. 1 illustrates an elevation of a double-action low pressure actuator with a yoke attachment according to the invention.

The actuator according to the invention works on the principle of an envelope which is expandable in one direction but not the other. In the invention, an elastomer tube is affixed at each end to respective disks of a diameter equal to the diameter of the elastomer tube. One disk is fixed while the other disk is free to slide axially away from the fixed disk on guides. Positioned outside the elastomer tube is a restraining tube which is constructed of a material which has tensile strength but not compressive strength, such as a woven fabric. The restraining tube will not stretch at working pressures but will bend or collapse. The restraining tube is of a sufficient length so that when it is fully extended, the fixed disk and the moveable disk are located at their maximum distance from each other. As the free sliding disk moves toward the fixed disk, however, the restraining tube collapses and crumples. Both the inner elastomer tube and the exterior restraining tube are fixed at each end to the two end disks in an air tight manner by known means such as clamps.

The fixed end disk has an orifice through which pneumatic (or low pressure hydraulic) fluid is applied in a controlled manner by known means, such as a compressor or pump. The pressure created by the fluid directed into the elastomer tube causes the elastomer tube to expand. Since its radial expansion is constrained by the exterior restraining tube, however, all the generated force is directed axially in the direction of moving the free sliding disk away from the fixed disk.

Basically, this invention is a fluid pressure actuated cylinder mechanism which can be used pneumatically (or alternatively, hydraulically) to create a longitudinal force (such as with pistons) or, when connected to a yoke, to create a rotary force (torque) (such as with an actuator). Actuators are commonly used in industrial applications for mechanically opening and closing valves.

The low pressure actuator according to the invention is directed to avoiding the problems of the prior art, that is, avoiding the problem of stretching inherent with bellows type or piston-tube type actuators by having the restraining tube at rest when fully extended, and having the tube crinkle or fold when not extended. In that way, there is no need to use a material, which is prone to bulging at high pressures when stretched. A fabric or some other type of flexible outer tube is suitable for this purpose.

If a woven fabric outer tube is used, the inner elastomer tube need not be thick as with conventional bellows and can be a very thin rubber, as it is fully constrained and supported by the fabric. The inner tube need only be thick enough so as not to bulge between the threads of the fabric and thus not wear prematurely. Using a thin rubber tube also has the advantage that it reduces the energy loss that is caused when thick rubber is stretched. In the invention, the rubber need not have great strength because the only purpose of the rubber is to contain the pressurizing fluid.

During the stroke of the actuator piston from the rest position, where the fabric is deformed, to the extended position where the tube is fully extended, there is no significant friction wear between the rubber and the fabric. This is because the rubber initially expands in the area of least resistance, that is, where the rubber is not in contact with the fabric. Consequently, there is no significant wear inducing rubbing between rubber and fabric when fully pressurized.

Existing types of bellows and solid tube piston actuators have serious shortcomings and limitations. With the bellows actuator, thrust is limited due to the fluid pressures which can be radially constrained by this method, and the restricted axial movement.

Solid tube pistons have the following limitations and handicaps:

(a) Friction loss;

(b) Seal wear, causing premature failure, and expensive repair or replacement;

(c) Air contaminants in the air can cause premature wear in seals, sometimes requiring air filters on the pneumatic supply to reduce this problem;

(d) Heavy, difficult to handle, thereby causing slower installation and high maintenance costs in larger sizes;

(e) High manufacturing cost due to close tolerance machining requirements for movement and air containment; and (f) Many parts and shapes.

(g) Side thrust when racks attached to opposing pistons act on a common pinion.

Figure 3:
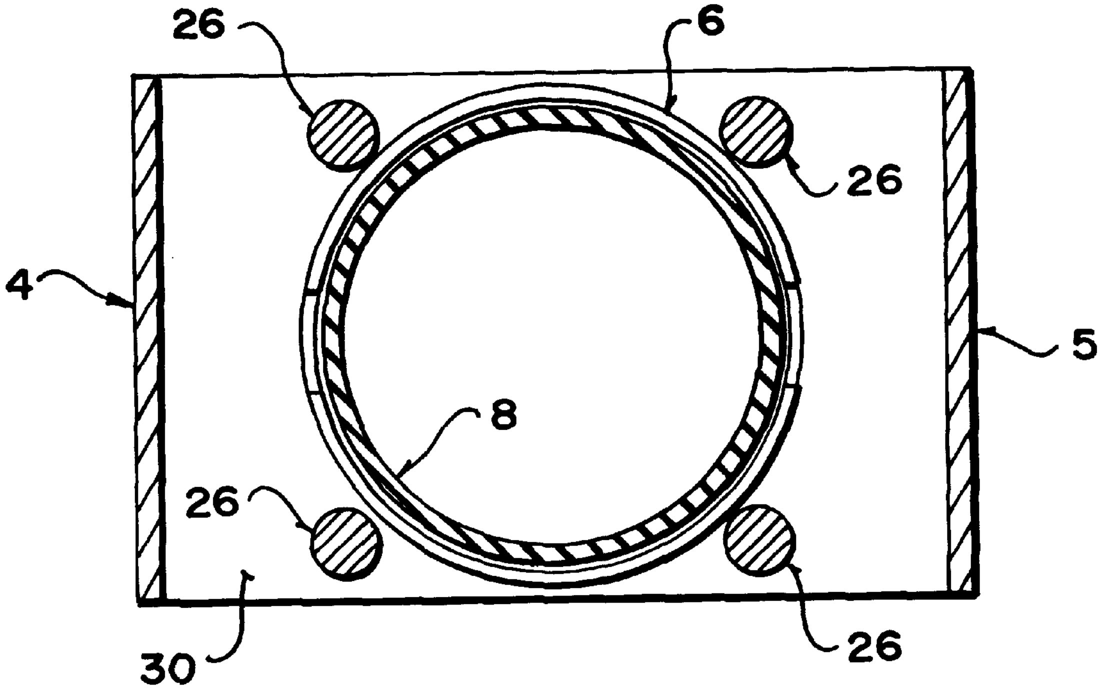
FIG. 3 illustrates a section view taken along section line A—A of FIG. 1.

Referring to FIG. 1, which illustrates an elevation view of a low pressure double action actuator 2, and FIG. 3, which illustrates a section view taken along section line A—A of FIG. 1, the actuator 2 has a pair of linear rigid frames 4 and 5 on either side (see FIG. 3). In between the two frames 4 and 5 is located an opposing pair of flexible bellows exterior fabric guide tubes 6 and 16 each of which encloses a stretchable flexible inner tube 8 (not shown in FIG. 1 but see FIG. 3) made of a fluid-proof rubber or elastomer. The exterior fabric guide tubes 6 and 16 are extendable in a horizontal linear direction but are not extendable in a radial direction. The fabric tubes 6 and 16 have resilient fluid impermeable inner tubes 8 (see detail in FIG. 6).

The opposite exterior ends of the two exterior guide tubes 6 and 16 are respectively connected to fixed end clamps 18 and 20 which are fixed to the actuator frames 4 and 5 by respective end plates 28 and 30. The interior bellows ends 12 of the two fabric guide tubes 6 and 16 are attached to interior moveable end clamps 22 and 24 on either side of central piston 10. Piston 10 slides on four tie bars 26 (see FIG. 3) which extend horizontally between the two ends of the longitudinal end plates 28 and 30 of the actuator 2.

When air is injected through an inlet (not shown) into one of the inner tubes 8, for example, through end plate 28, on the right in FIG. 1, the pressure of the air causes the inner tube 8 to expand in the only direction it can, namely towards the piston 10. The radially fixed bellows portion 12 of the exterior guide tube 6 also expands and moves the piston 10 to the left. The piston 10 is connected to the rotary yoke 14 and causes shaft 15 to rotate.

The opposite action occurs when the right inner tube 8 and exterior guide tube 6 are deflated and the left inner tube 8 and exterior guide tube 16 are inflated. This provides a double-action actuator.

Figure 2:
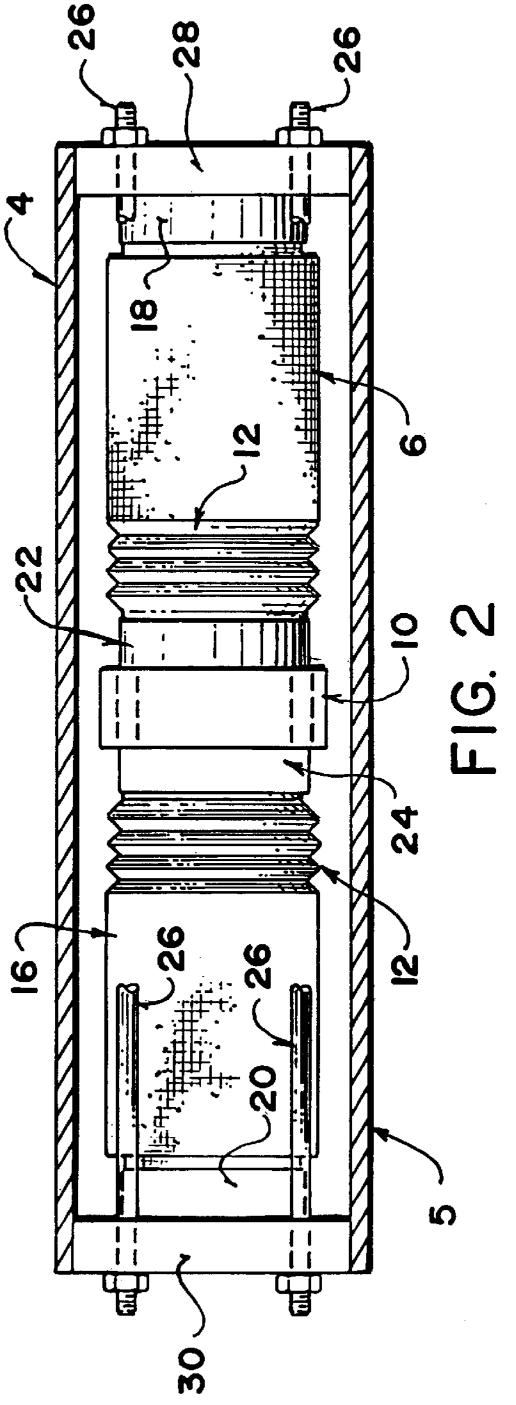
FIG. 2 illustrates a plan view of the double-action low pressure actuator.

FIG. 2 illustrates a plan view of the actuator 2 including frame plates 4 and 5, exterior fabric guide tubes 6 and 16, reciprocating piston 10, tie bars 26, first and second fixed end clamps 18 and 20, first and second free end clamps 22 and 24, and end plates 28 and 30.

The two inner tubes 8 are made of air or oil impermeable rubber or a similar fluid impermeable flexible elastomeric product. With the radial constraint created by the two exterior fabric tubes 6 and 16, the two inner tubes 8 can expand only in an axial direction and cannot expand radially. The exterior fabric tubes 6 and 16 are attached to the respective inner tubes 8 only at each end. While an inner tube 8 is in full tension such as when it is fully inflated (the elastomer is stretched), the constraining exterior fabric tube 6 or 16, as the case may be, is also at full length. When the specific inner tube 8 is shortened, such as when it is deflated, the constraining exterior fabric tube 6 or 16, as the case may be, folds or buckles in a random manner (see bellows 12 in FIG. 1).

Solid metal or plastic disks or clamps 18 and 22 are located at each end of exterior fabric tube 6, while a second set is located at each end of exterior fabric tube 16. At one end, the disk 18 is securely fixed to the end plate 28 and has an entry port to which is attached a fitting for a pneumatic air supply into the inner tube 8. The disk 22 at the other interior end of the exterior fabric tube 6 and inner tube 8 is associated with piston 10 and slides on four guides 26. The disk 22 can be separate or be part of the piston 10 to which is attached either the fittings for a yoke 14 for the actuator to impart rotary motion to a shaft 15, or a rod for transmitting horizontal linear force. The inner tube 8 and the exterior fabric tube 6 are attached at each end to the disks by removable clamps 18 and 22 (similar to hose clamps). When compressed air is supplied through the fitting and the fixed disk, the inner tube 8 is inflated and stretches. At the same time, the exterior fabric tube 6 lengthens and loses its folds, creases or buckles while at the same time restraining radial stretching of the inner tube 8. Thus all force due to inflation is applied axially in the direction of the piston 10.

Figure 4:
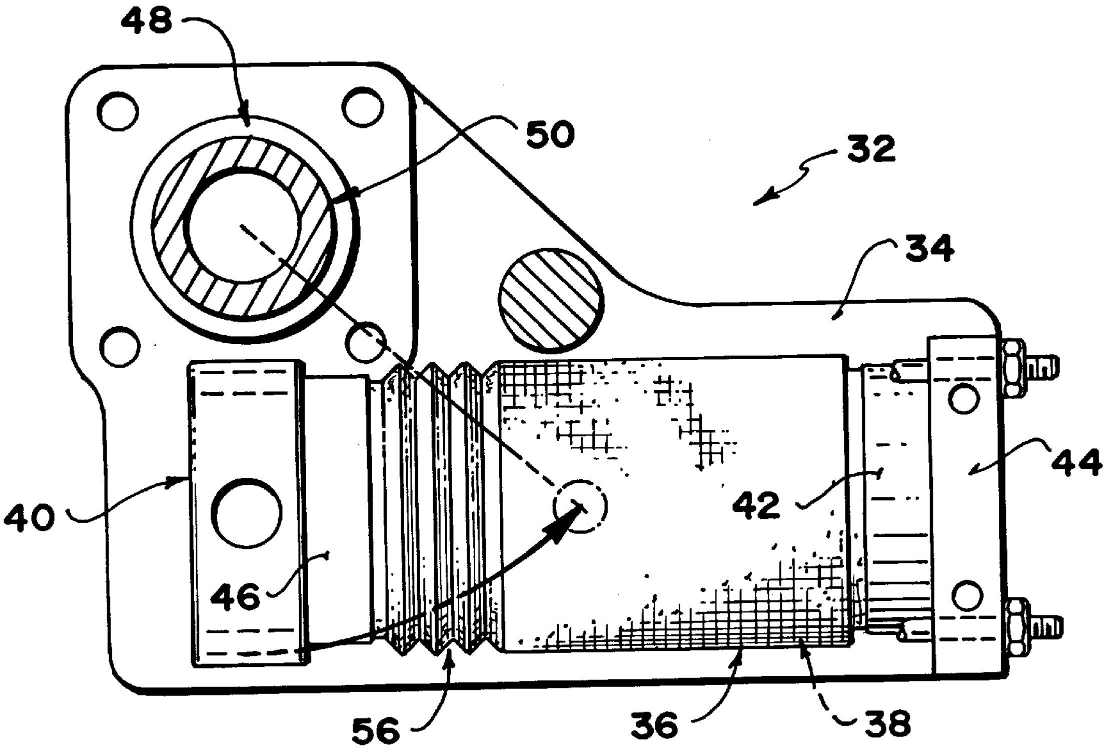
FIG. 4 illustrates an elevation of a single-action low pressure actuator, with a yoke attachment.
Figure 5:
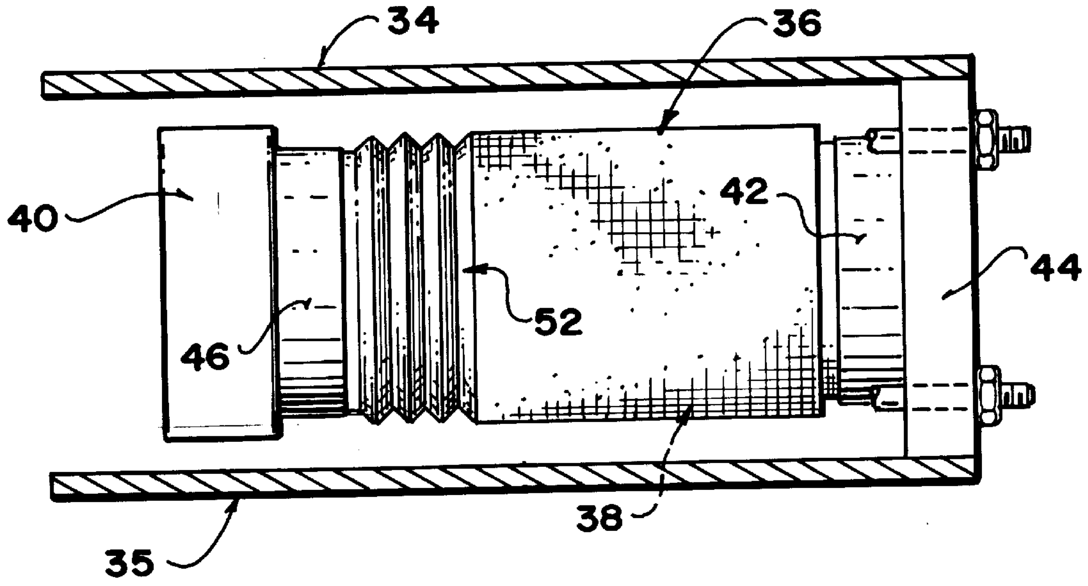
FIG. 5 illustrates a plan view of a single-action low pressure actuator.

When the compressed air pressure is released, the exterior tube 6 returns to its original position, either by means of a spring (not shown) attached to the piston 10, located either inside or outside the exterior tube 6 (a single action as illustrated in FIGS. 4 and 5), or by an opposed double acting piston (two inner tubes 8 with a common sliding piston 10 in the middle and a fixed disk at either end), as illustrated in FIGS. 1, 2 and 3.

FIG. 4 illustrates an elevation of a single-action low pressure actuator 32. FIG. 5 illustrates a plan view of the single-action low pressure actuator 32. Basically, as seen in FIGS. 4 and 5, the single-action actuator 32, comprising a single fabric tube 36, with an inner elastomer tube 38, is enclosed in a pair of side frames 34 and 35. In FIGS. 4 and 5, only an exterior fabric tube 36 is visible. The interior elastomer inner tube 38 is not visible. One end of the exterior fabric tube 36 is secured by clamp 42 to end plate 44. The free end of the exterior tube 36 is secured to a clamp 46 which is connected to piston 40. The movement of the piston 40 by a yoke mechanism 48 imparts a torque on shaft 50. The longitudinal movement created by inflating or deflating the resilient inner tube 38 with a pneumatic or hydraulic fluid is taken up with bellows or wrinkled section 52.

Figure 6:
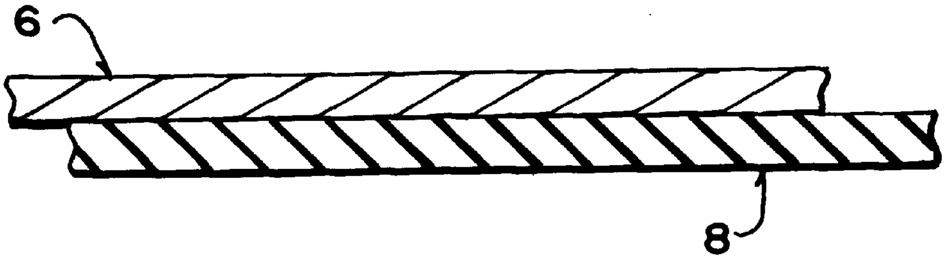
FIG. 6 illustrates a detail section of a fabric tube and inner tube.

FIG. 6 illustrates a cross-section view of a portion of the fabric guide tube 6 and rubber inner tube 8. The dotted circle is not part of the invention and is simply a border highlighting the cross-section. The guide tube 6 and inner tube 8 can be separate from one another or fused together. In some cases, it may be desirable to form the guide tube 6 and inner tube 8 as one integrated unit.

Figure 7:
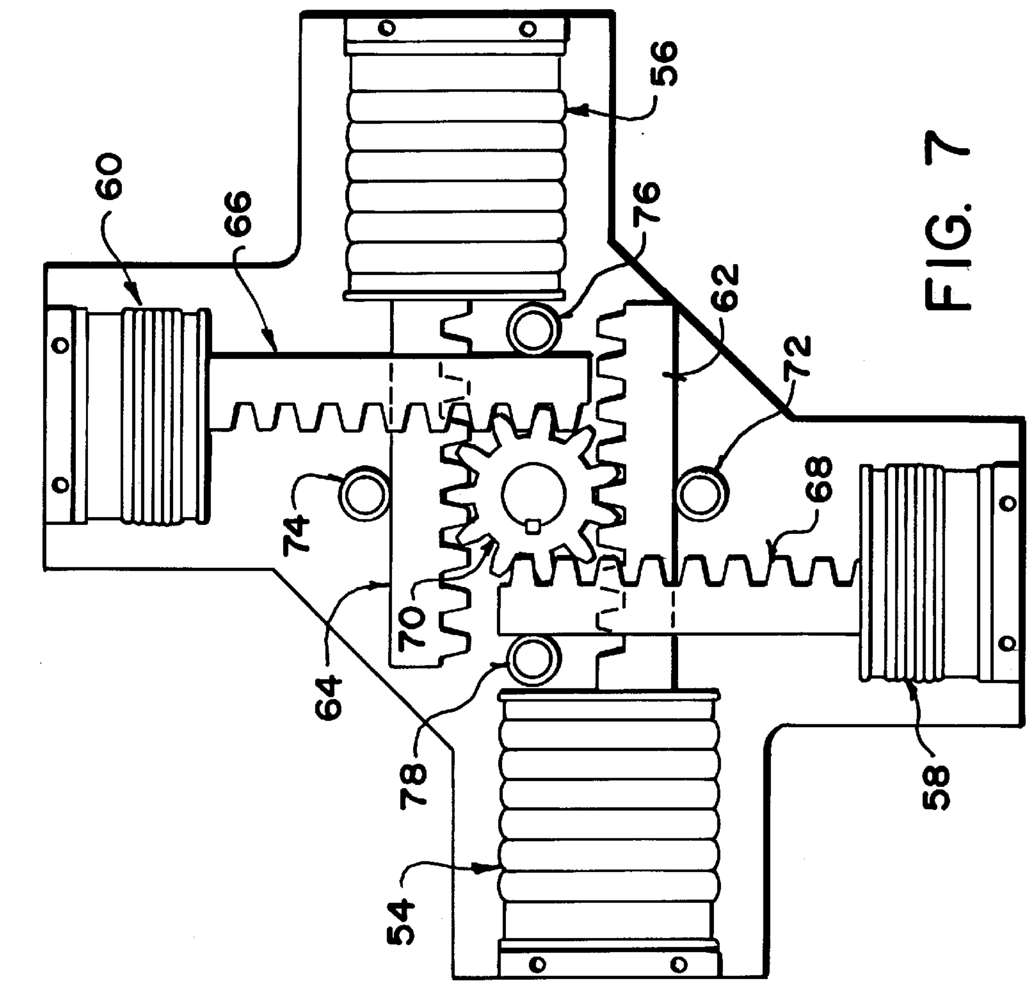
FIG. 7 illustrates an elevation of four actuators with toothed racks engaging a common gear.

FIG. 7 illustrates an elevation of four actuators with toothed racks engaging a common gear. As seen in FIG. 7, first, second, third and fourth exterior tubes 54, 56, 58 and 60 are arranged at 90° positions relative to one another. Each of the four tubes 54, 56, 58 and 60 have corresponding racks 62, 64, 66 and 68, protruding from the interior sides thereof towards and engaging a common central spur gear 70. The four racks 62, 64, 66 and 68 have on one side thereof teeth which engage the matching teeth of the common spur gear 70. It will be noted that the tubes function in pairs. In FIG. 7, the opposing tubes 54 and 56 are extended while the other opposing pair of tubes 58 and 60 are compressed. The racks 62, 64, 66 and 68 are restricted from diverging or jumping off the teeth of the spur gear 70 by respective guide rollers 72, 74, 76 and 78.

Figure 8:
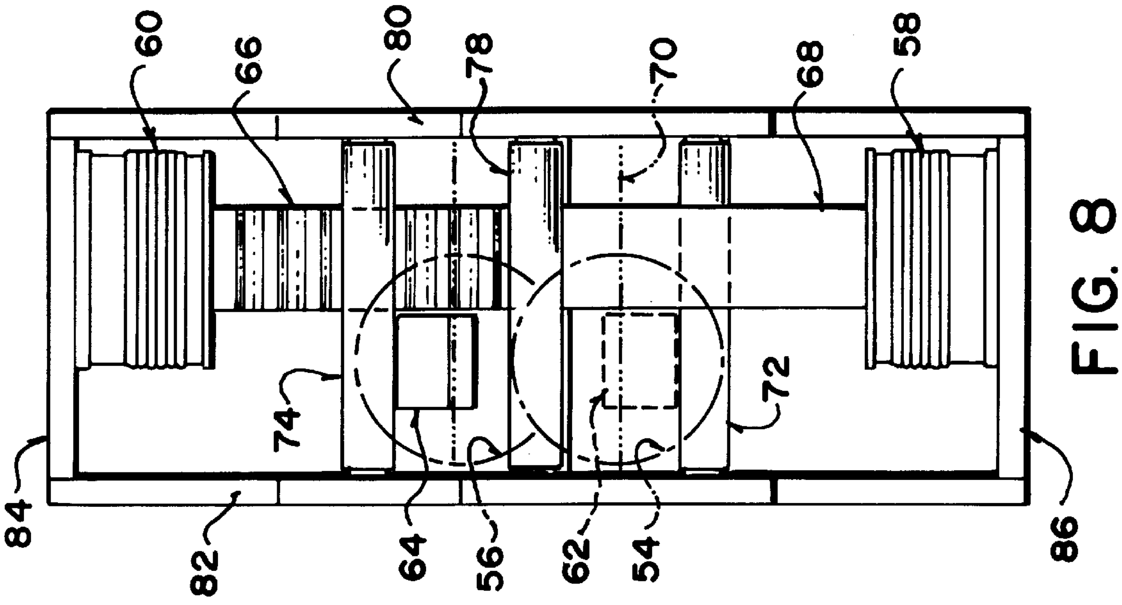
FIG. 8 illustrates a plan view of the four actuator system illustrated in FIG. 7.

FIG. 8 illustrates a plan view of the four actuator system shown in FIG. 7. The four tubes 54, 56, 58 and 60, and the racks 62, 64, 66 and 68 are mounted on and held in place by a first frame 80, a second frame 82 and respective end frames 84 and 86.

The invention is particularly applicable to pneumatic actuators, which is the most common use, but it should be understood that the invention has application in other areas as well, including hydraulics. The figures illustrate preferred embodiments of the invention. However, it will be understood that a number of variations can be made which nonetheless represent part of the overall invention. For example, by using a combination material such as a an elastomer or rubberized fabric, or other similar material, which is airtight or oil tight, the outer restraining tube 6 can serve two purposes, thereby eliminating the need for a separate inner rubber or elastomer tube 8.

Another possible variation is that while the length of the restraining tube 6, when at rest, is as described above, the length at rest of the inner rubber or elastomer tube 8 may vary depending on various factors.

The drawings (particularly FIG. 3) illustrate the four guiding tie bar mechanisms 26 as being exterior to both tubes 6 and 8. However, for certain applications, the guiding mechanism could be one or more telescopic tubes affixed to and joining the respective fixed end clamps 18 and 20 and moveable clamps 22 and 24 inside the inner elastomer tube 8.

Advantages, Modifications or Variations of the Invention (1) Since the radial force is absorbed by the exterior fabric tube 6, the resilient inner tube 8 can be very thin as it only serves as an fluid or air seal. The radial force of the air pressure is contained by the exterior fabric tube 6.

(2) A one-way stretch fabric material of the exterior tube 6 can be embedded, built in or attached to the resilient inner tube 8 throughout the length rather than leaving it attached only at the ends.

(3) The exterior fabric tube 6 can be manufactured either from a flat fabric with a longitudinal seam to create a tubular shape, or from fabric woven as a tube.

(4) The exterior fabric tube 6, by shape or content can be constructed in such a way as to guide the wrinkling effect in a bellows manner on deflation rather than allowing it to wrinkle in a random manner.

(5) Depending on the combination of materials used (fabric, rubber, etc.) there is sometimes a need for a fixed rigid guide tube of metal or plastic attached to the frame outside the fabric (or flexible tube if integrated). As seen in FIG. 3, the guide tube would be positioned between the exterior tube 6 and the bars 26. This serves to control deformation buckling. In the case of actuator use, this guide tube may have longitudinal slots to allow movement of the force components attached to the sliding piston.

(6) The piston 10 can be activated by filling the inner tube 8 with a hydraulic fluid rather than pneumatically.

(7) The elastomer inner tube 8, if advantageous, can be bonded to the exterior fabric tube 6.

(8) The actuator 2 can be single-acting (as seen in FIGS. 4 and 5) with a spring return (spring attached either inside or outside) or double-acting as illustrated in FIGS. 1 and 2. The return force for a single acting actuator can be provided by a helical spring inside the inner elastomer tube 8, or an exterior spring return mechanism.

(9) The guide rods 26 which assist axial movement can be eliminated and replaced by an interior telescoping guide rod internally attached to a fixed end plate 28 or 30 and corresponding moveable clamps 22 or 24. Telescoping guides are used in many areas such as umbrella handles, etc. This modification would not be particularly useful for a rotational actuator but would be a useful modification for certain space-limited applications in axial thrust applications.

Methods of Application of the Invention (1) FIGS. 1 and 2 of the drawings illustrate a double acting actuator using a yoke mechanism to convert the axial force to a torque. FIGS. 4 and 5 illustrate a single-action actuator which also applies a torque to a shaft. The yoke and rotary action and shaft can be eliminated if a linear reciprocating action is required.

(2) "Piston in cylinder" valve actuators commonly use a rack and pinion assembly for torque creation. In double acting actuators of this type or dual force actuators (opposing pistons, both giving force in the same direction) the cylinders are typically manufactured as one in line tube. When the racks act on opposite sides of the pinions, this creates a side force due to the offset of each set of teeth from the axial centre of each cylinder. These handicaps do not exist with the subject invention because with the subject invention, it is simple to manufacture an assembly of two opposing cylinders with racks whose teeth are centred on the axis of their respective cylinders. The two cylinders are mounted on a plate in such a way as to offset axially from each other sufficient to direct their resultant force to their respective sides of the common pinion in the case of a double-acting actuator. In the case of a dual force actuator, both cylinders are aligned to correctly give the maximum delivered force to the pinion.

(3) The simple design and the economy of manufacturing cost, enable a short stroke double-acting dual force rotary actuator to be constructed using four radially arranged cylinders mounted on a circular plate and driving a single pinion (see FIGS. 7 and 8).

Advantages of the Invention (1) The actuator according to the invention is less expensive to manufacture than other conventional actuators because there is no requirement for air seals between moving parts. The actuator is simple in construction and there is less requirement for machining.

(2) The actuator of the invention is lighter in weight than current actuators because of fewer parts. Also there is no solid metal tube.

(3) The only moving parts (excluding the exterior slides and yoke mechanism) are the elastomer inner tube and exterior fabric tube. Both these parts are inexpensive to buy and simple and quick for a shop mechanic to replace with no specialized tools.

(4) There is low wear because apart from the elastomer and fabric tubes, all other parts are exterior and create almost no environment for failure or wear.

(5) Contaminated air causes no problems, because there are no sliding air seals to become clogged or fouled.

(6) When used as a double acting horizontal cylinder, the travel can be approximately 75% of total length. This expandability is very useful in tight confined locations.

As a general rule, typical pneumatic actuators work in the range roughly of 80 to 100 psig. Normal fabrics such as cotton and the attendant stitching are not suitable for the exterior tubing because the cotton will not withstand such pressures without failing. However, suitable fabrics on the market made from textiles such as Nylon™, Mylar™, and the like, will withstand such pressures.

Hydraulic actuators can work up to 6000 psig, but typically for safety reasons work at only 1500 psig. 1500 psig pressure is much higher than the subject invention will withstand. Generally, there is no reason to use hydraulics at low pressure because it is uneconomical. However, an exception is in domestic tap water supply systems. An actuator according to the invention can operate using domestic water hookup if there are very few cycles per day. In this application, no air compressor or hydraulic pump is required and the application is practical if water consumption is small and only a few cycles a day are required.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. An actuator comprising:

(a) a flexible hollow fluid impermeable bladder which can be expanded along an axis when a fluid is introduced into the bladder, and contracted along the same axis when fluid is withdrawn from the bladder;

(b) a moveable mechanism associated with the bladder that moves in the same direction when the bladder expands upon the introduction of fluid into the bladder and contracts in the same direction upon withdrawal of fluid from the bladder;

(c) a moveable connector associated with a moveable end of the bladder and linking the bladder to the moveable mechanism; and (d) a rigid frame which houses the bladder and the moveable mechanism.

2. An actuator as claimed in claim 1 wherein the bladder is expandable in all directions, but the bladder is confined in a restrainer which restricts expansion of the bladder to the one axis.

3. An actuator as claimed in claim 2 wherein the moveable connector slides on a restraining rod.

4. An actuator as claimed in claim 2 wherein the moveable mechanism is a piston.

5. An actuator as claimed in claim 4 wherein the piston is attached to a yoke which converts axial motion to rotary motion.

6. An actuator as claimed in claim 2 wherein the bladder is connected to a rack and pinion combination.

7. An actuator as claimed in claim 2 wherein first and second bladders are placed end to end on opposite sides of the moveable mechanism and provide reciprocating action to the moveable mechanism in either direction along the axis when fluid is alternatingly introduced into the first and second bladders.

8. An actuator as claimed in claim 7 wherein the first and second bladders have toothed racks which engage with teeth on the moveable mechanism.

9. An actuator as claimed in claim 2 wherein first, second, third and fourth bladders are arranged in opposing pairs orientation about the moveable mechanism and actuate the moveable mechanism in unison.

10. An actuator as claimed in claim 9 wherein the moveable mechanism is a gear and the first, second, third and fourth bladders have toothed racks which engage the teeth of the gear.

11. An actuator as claimed in claim 2 wherein the bladder is made of elastomer.

12. An actuator as claimed in claim 2 wherein the restrainer is made of a collapsible fabric.

13. An actuator as claimed in claim 2 wherein the fluid is compressed air or hydraulic oil.

14. An actuator as claimed in claim 1 wherein the moveable mechanism is a piston.

15. An actuator as claimed in claim 14 wherein the piston is attached to a yoke which converts axial motion to rotary motion.

16. An actuator as claimed in claim 1 wherein the bladder is constructed of a fluid impermeable fabric.

17. An actuator as claimed in claim 1 wherein the bladder is of two-ply construction comprising a fabric outer tube and an elastomer inner tube.

18. An actuator as claimed in claim 17 wherein a fixed connector is located on an end of the bladder opposite to the moveable connector and secures a fixed end of the bladder to the rigid frame.

19. An actuator as claimed in claim 1 wherein a fixed connector is located on an end of the bladder opposite to the moveable connector and secures a fixed end of the bladder to the rigid frame.

20. An actuator as claimed in claim 1 wherein first and second bladders are placed end to end on opposite sides of the moveable mechanism and provide reciprocating action to the moveable mechanism in either direction along the axis when fluid is alternatingly introduced into the first and second bladders.

21. An actuator as claimed in claim 17 wherein the first and second bladders have toothed racks which engage with teeth on the moveable mechanism.

22. An actuator as claimed in claim 1 wherein the fluid is compressed air or hydraulic oil.

23. An actuator comprising:

(a) a flexible hollow fluid impermeable bladder which can be expanded solely alone an axis when a fluid is introduced into the bladder, and contracted along the same axis when fluid is withdrawn from the bladder;

(b) a moveable mechanism associated with the bladder that moves in the same direction when the bladder expands upon the introduction of fluid into the bladder; and (c) a moveable connector associated with a moveable end of the bladder and linking the bladder to the moveable mechanism, wherein the moveable connector slides on a restraining rod.

24. An actuator comprising:

(a) a flexible hollow fluid impermeable bladder which can be expanded along an axis when a fluid is introduced into the bladder, and contracted along the same axis when fluid is withdrawn from the bladder; and (b) a moveable mechanism associated with the bladder that moves in the same direction when the bladder expands upon the introduction of fluid into the bladder, wherein the bladder is connected to a rack and pinion combination.

25. An actuator comprising:

(a) a flexible hollow fluid impermeable bladder which can be expanded along an axis when a fluid is introduced into the bladder, and contracted along the same axis when fluid is withdrawn from the bladder; and (b) a moveable mechanism associated with the bladder that moves in the same direction when the bladder expands upon the introduction of fluid into the bladder, wherein first, second, third and fourth bladders are arranged in opposing pairs orientation about the moveable mechanism and actuate the moveable mechanism in unison.

26. An actuator as claimed in claim 25 wherein the moveable mechanism is a gear and the first, second, third and fourth bladders have toothed racks which engage the teeth of the gear.

* * * * *